(12) United States Patent
Mutz et al.

(10) Patent No.: US 7,038,964 B2
(45) Date of Patent: May 2, 2006

(54) ACCESS TO A COMMON MEMORY IN WHICH A PRIORITY ACCESS TO A NON-ACTIVE BANK IS PREPARED DURING A NON-PRIORITY ACCESS TO A DIFFERENT BANK

(75) Inventors: Stephane Mutz, Caen (FR); Hugues De Perthuis, Caen (FR); Thierry Gourbilleau, Carquefou (FR)

(73) Assignee: Koninklijke Philips Electronics N.V., Eindhoven (NL)

( * ) Notice: Subject to any disclaimer, the term of this patent is extended or adjusted under 35 U.S.C. 154(b) by 114 days.

(21) Appl. No.: 10/478,559

(22) PCT Filed: May 21, 2002

(86) PCT No.: PCT/IB02/01793

§ 371 (c)(1),
(2), (4) Date: Nov. 21, 2003

(87) PCT Pub. No.: WO02/095602

PCT Pub. Date: Nov. 28, 2002

(65) Prior Publication Data

US 2004/0148452 A1    Jul. 29, 2004

(30) Foreign Application Priority Data

May 22, 2001    (FR)    .................................. 01 06750

(51) Int. Cl.
*G06F 13/14*    (2006.01)
*G11C 7/00*    (2006.01)

(52) U.S. Cl. ............. 365/220; 365/189.04; 365/230.03; 710/20; 710/21; 711/150; 711/151; 711/168; 711/5; 711/105

(58) Field of Classification Search ........... 365/189.04, 365/189.01, 189.05, 189.03, 220, 230.03, 365/230.05; 710/20, 21, 52; 711/5, 120, 711/130, 147, 148, 149, 150, 151, 168, 104, 711/105
See application file for complete search history.

(56) References Cited

U.S. PATENT DOCUMENTS 5,058,051 A * 10/1991 Brooks ........................ 711/167
5,594,876 A * 1/1997 Getzlaff et al. ............. 710/113
5,659,715 A * 8/1997 Wu et al. ..................... 711/170
5,959,929 A * 9/1999 Cowles et al. .......... 365/230.03

FOREIGN PATENT DOCUMENTS

EP    1191445 A2 *    3/2002
GB    2381622 A  *    5/2003

* cited by examiner

*Primary Examiner*—B. James Peikari

(57) ABSTRACT

Access of multiple data processing circuits to a common memory having several banks is managed, the memory being connected to one or several circuits for processing ordinary data and to a circuit for processing priority data. A method of managing access includes producing an access demand of a circuit for processing ordinary data to a bank of the memory, starting the realization of the demanded access, subsequently producing an access demand of the circuit for processing priority data to another bank of the memory, preparing, during the realization of the access demanded by the ordinary data processing circuits, the other bank of the memory, and interrupting the access in the course of realization as soon as said preparation is completed.

10 Claims, 6 Drawing Sheets

Figure 1:
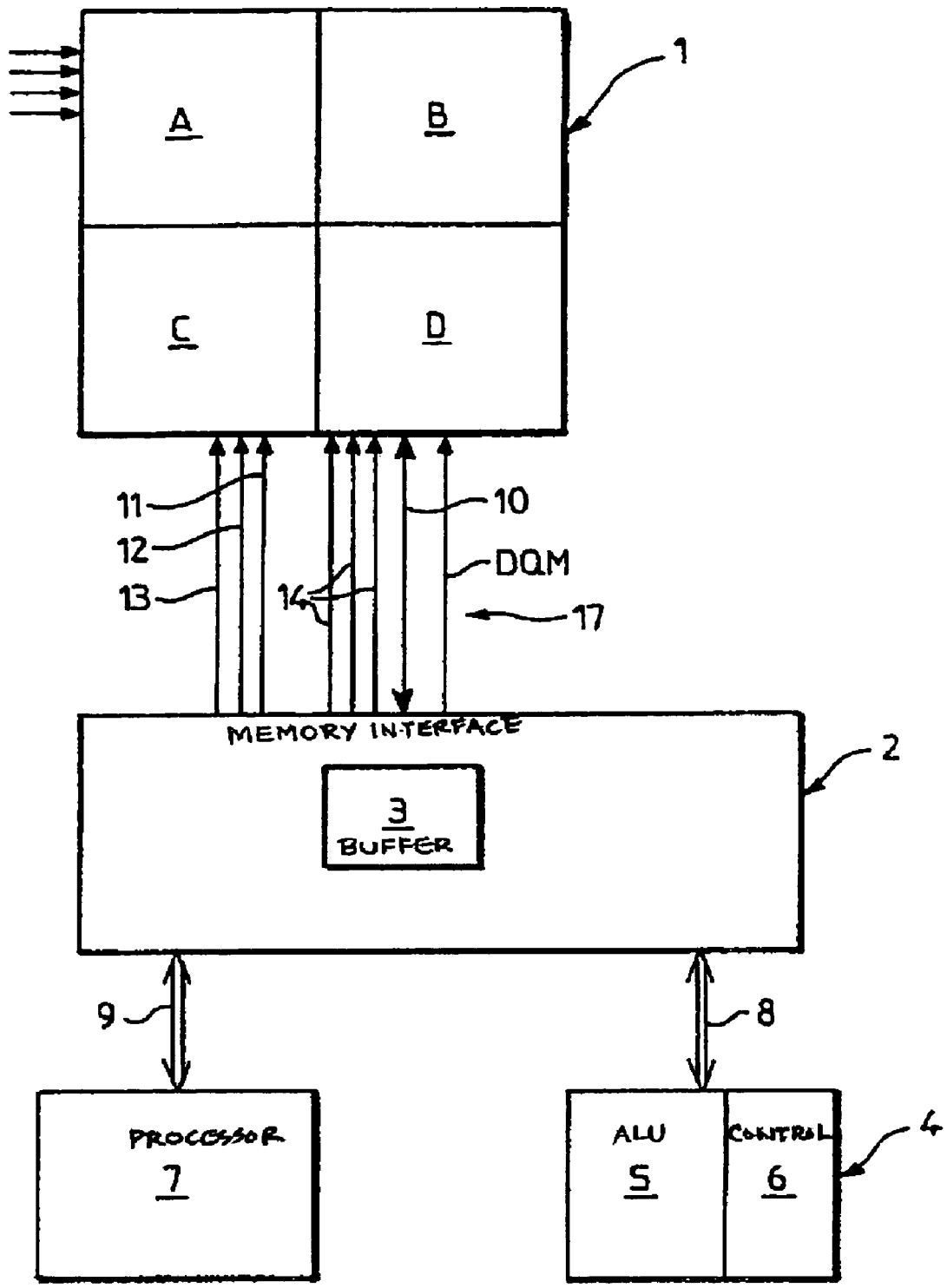

ACCESS TO A COMMON MEMORY IN WHICH A PRIORITY ACCESS TO A NON-ACTIVE BANK IS PREPARED DURING A NON-PRIORITY ACCESS TO A DIFFERENT BANK

The invention relates to a method of managing access operations to a memory comprising several banks, notably of the SDRAM type (Synchronous Dynamic Random Access Memory), a memory interface circuit, a computer program suitable to be executed by such an interface circuit, and a data processing system.

Data processing systems comprising a memory with several banks, notably of the SDRAM type, are known, which are accessed by a data processing circuit such as a processor via an appropriate interface by producing access requests. Data processing systems are also known which comprise one or several circuits for processing specific data, for example, video data, functioning independently or in combination and accessing a memory so as to read or write specific data, and one or several controllers accessing another memory for reading or writing appropriate instruction codes.

A controller accesses the memory for reading or writing instruction codes. As long as it has not effected its access, the controller remains blocked, which slows down the execution of all the processes which it must perform. However, when it is provided with a cache memory, a controller needs to access the memory less frequently than a circuit performing functions making intensive use of data, such as, for example, a video data processing circuit.

It is an object of the invention to provide only a single common memory for one or several specific data processing circuits and one or several controllers without detrimental effects for the efficiency of each of them or for the efficiency of the data processing system as a whole.

To this end, the invention provides a method of managing access of a plurality of data processing circuits to a common memory comprising several banks, in which a single access to the memory can be realized simultaneously, the memory being connected via an appropriate interface to at least a circuit for processing ordinary data and to a circuit for processing priority data, the method comprising the steps of:

producing, at the level of the interface, an access demand of the circuit for processing ordinary data to a bank of the memory, starting the realization of the demanded access, subsequently producing, at the level of the interface, an access demand of the circuit for processing priority data to another bank of the memory, preparing, during the realization of the access demanded by the ordinary data processing circuit, said other bank of the memory, suspending the access in the course of realization as soon as said preparation is completed for immediately realizing the access to the circuit for processing priority data.

By virtue of this method, the circuit for processing priority data, for example, a controller can access the memory with a minimal delay by interrupting all access operations of a circuit for processing ordinary data, for example, video data. The development of all the operations which it controls is thus slowed down to a minimum. Moreover, the access which is in progress is interrupted at the latest possible instant when the access of the priority data processing circuit is ready to be realized immediately. Consequently, the passband of the memory is used in an optimum manner.

Advantageously, the method according to the invention also comprises a step of resuming the suspended access as soon as the access to the priority data processing circuit has been completed.

The circuit for processing priority data preferably comprises a controller, the priority data comprising command instructions.

The memory is preferably of the SDRAM type, while the preparation comprises a step of activating a row of said other bank forming the subject of an access operation.

The invention also provides a data processing system comprising:

a memory comprising several banks, an interface circuit connected to the memory, at least a circuit for processing ordinary data and a circuit for processing priority data both connected to the interface circuit, each data processing circuit being suitable for demanding access operations to the memory via the interface circuit which is suitable for commanding the realization of the demanded access operations, in which a single access to said memory can be realized simultaneously, in which system the interface circuit comprises means for:

preparing a certain bank when the priority data processing circuit demands access to said certain bank of the memory during the realization of an access operation of the ordinary data processing circuit to another bank of the memory, suspending the access in the course of realization as soon as said preparation for realizing the access of the priority data processing circuit to said certain bank has been completed.

The use of a common memory for the different data processing circuits allows a reduction of the costs of realizing the system as a whole.

Advantageously, said interface circuit also comprises means for resuming the suspended access as soon as the access of the priority data processing circuit has been completed.

Each data processing circuit can preferably demand access to said memory by sending an access request to the interface circuit, each access request defining a type of access among the read and write types and designating one or several memory locations forming the subject of an access, the access requests of the ordinary data processing circuit designating memory locations in at least one bank of said memory dedicated to the ordinary data, the access requests of the priority data processing circuit designating memory locations in at least one bank of said memory dedicated to the priority data.

The invention also provides an interface circuit of a memory comprising several banks and being capable of simultaneously supporting only a single access, intended to be connected to at least a circuit for processing ordinary data and a circuit for processing priority data, each data processing circuit being suitable for demanding access operations to the memory via the interface circuit which is suitable for commanding the realization of the demanded access operations, and comprises means for:

preparing a certain bank when the priority data processing circuit demands access to said certain bank of the memory during the realization of an access operation of the ordinary data processing circuit to another bank of the memory, suspending the access in the course of realization as soon as said preparation for realizing the access of the priority data processing circuit to said certain bank has been completed.

The invention also provides a computer program comprising instruction codes suitable to be read or stored on a record carrier, said instruction codes being suitable to be executed by a programmable interface circuit intended to be connected to a memory comprising several banks and being capable of simultaneously supporting only a single access operation, and to at least a circuit for processing ordinary data and a circuit for processing priority data, each data processing circuit being suitable for demanding access operations to the memory via the interface circuit which is suitable for commanding the realization of the demanded access operations, in which program the execution of said instruction codes is suitable for performing, at the level of the interface circuit, the steps of:

preparing a certain bank when the priority data processing circuit demands access to said certain bank of the memory during the realization of an access operation of the ordinary data processing circuit to another bank of the memory, suspending the access in the course of realization as soon as said preparation for realizing the access of the priority data processing circuit to said certain bank has been completed.

The invention relates to access operations to any memory of the SDRAM or other types, comprising several banks, in which the access to a bank may be prepared while another bank is being accessed.

These and other aspects of the invention are apparent from and will be elucidated, by way of non-limitative example, with reference to the embodiment(s) described hereinafter.

Figure 2:
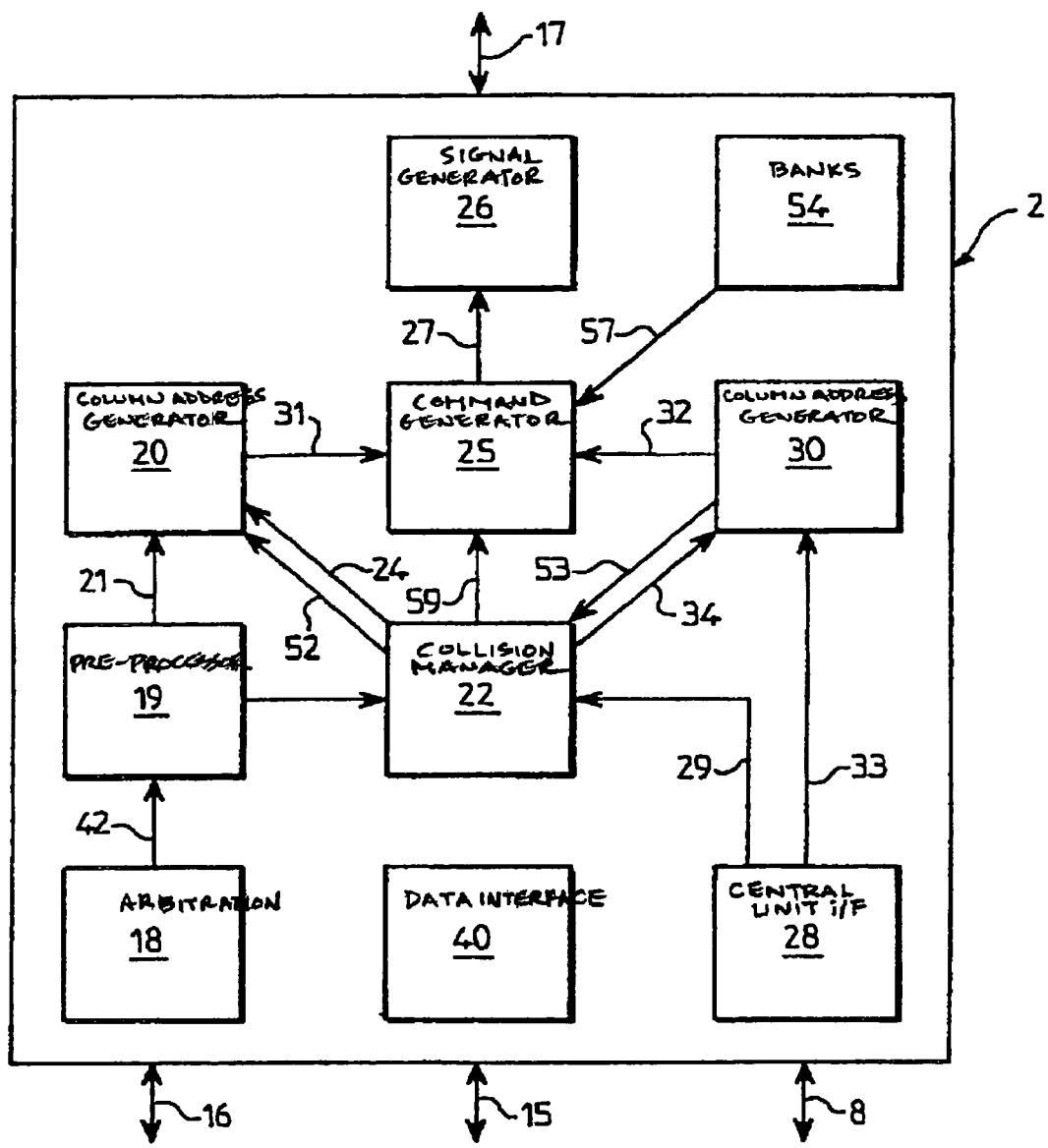
Figure 3:
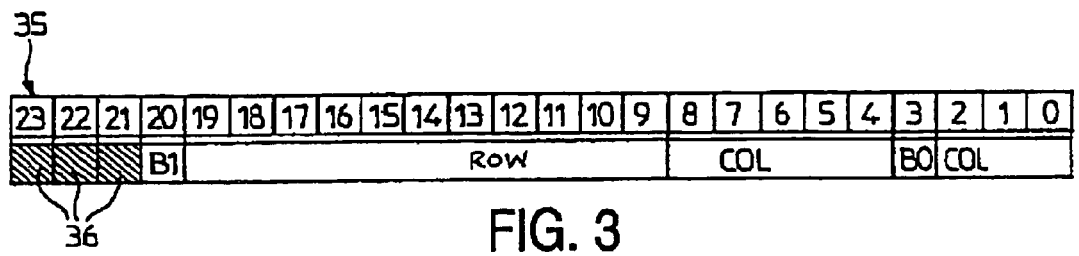
Figure 4:
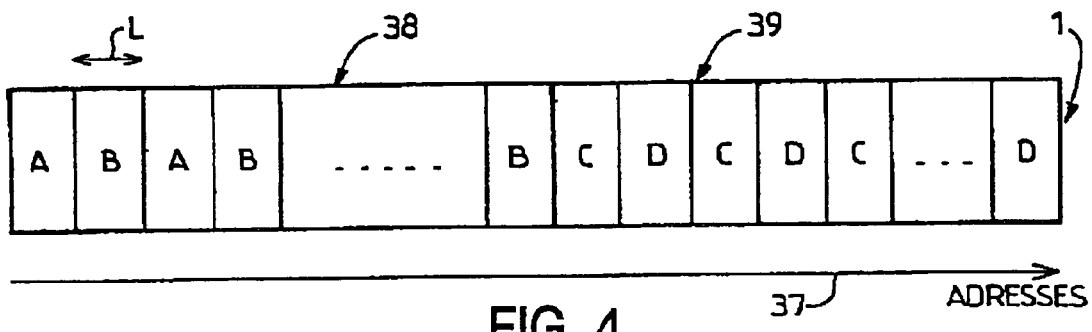
Figure 6A:
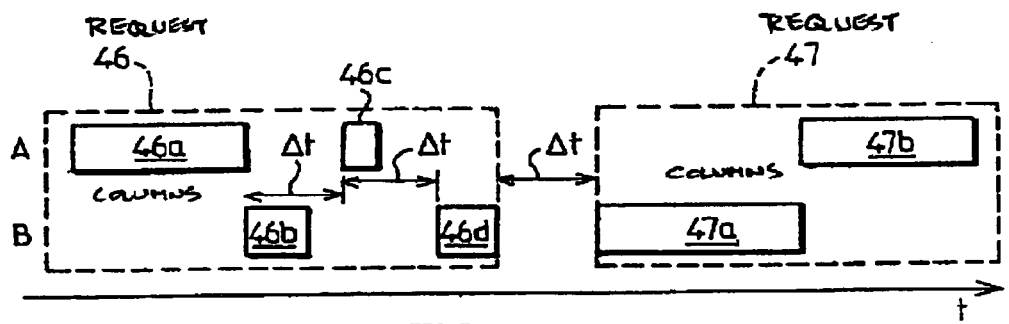
Figure 6B:
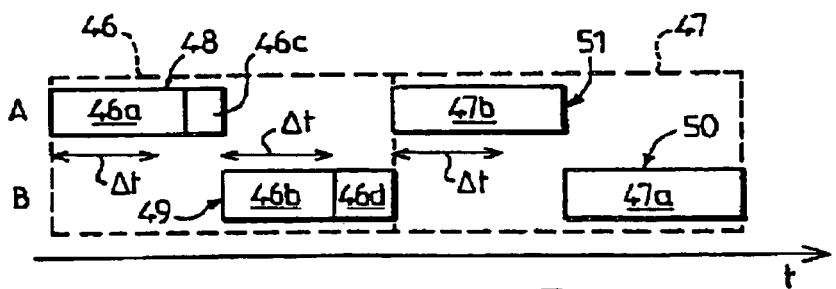
Figure 5A:
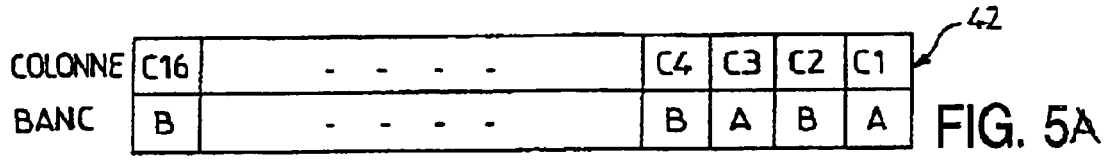
Figure 5B:
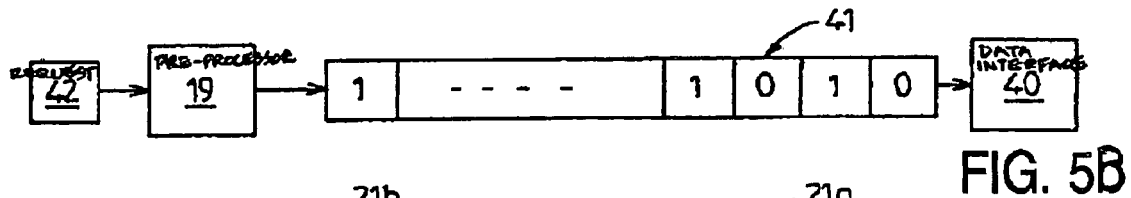
Figure 5C:
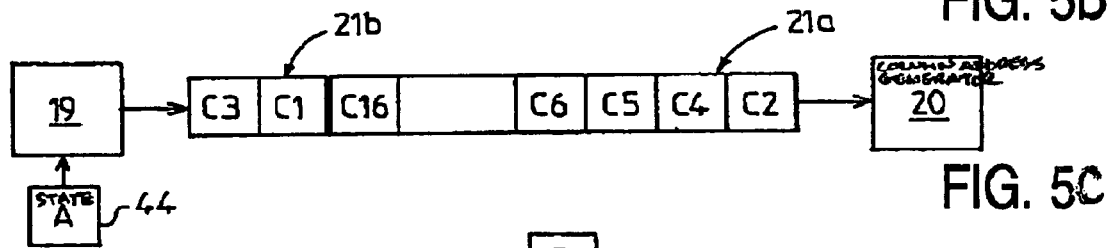
Figure 5D:
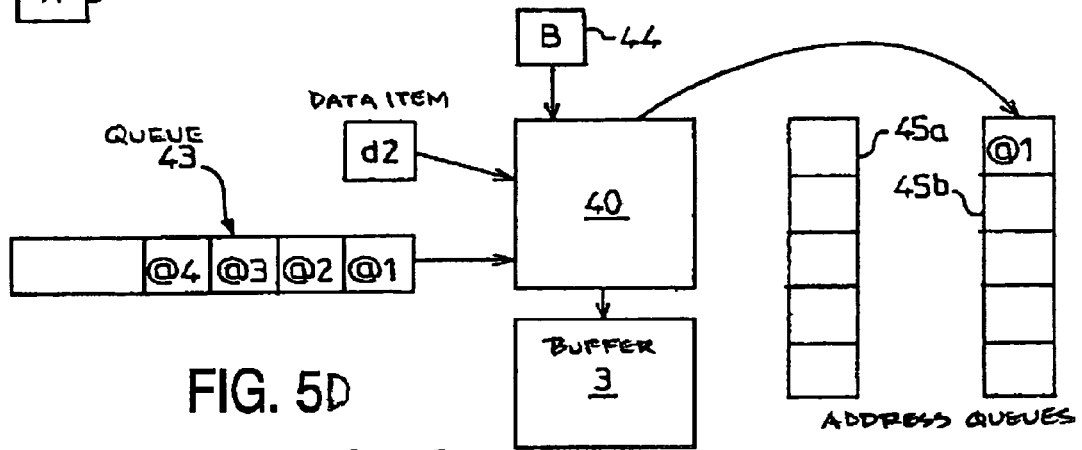
Figure 5E:
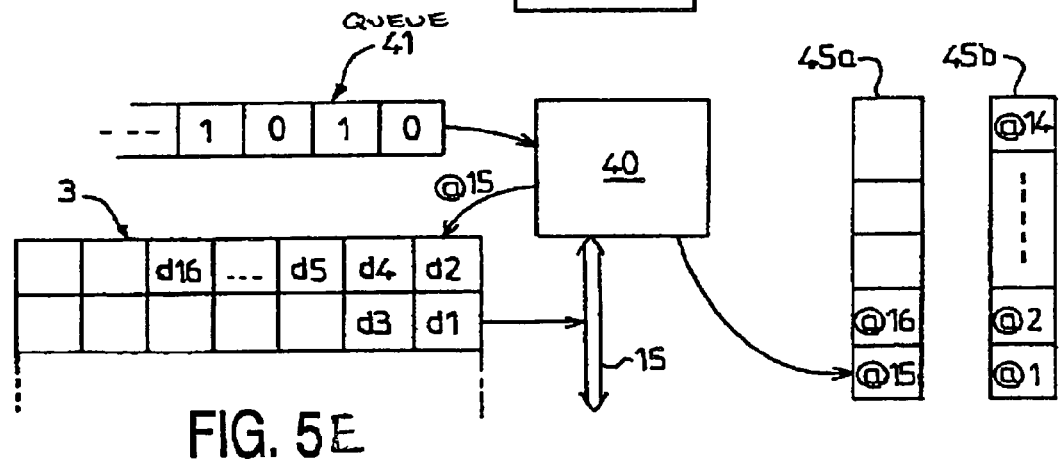
Figure 7:
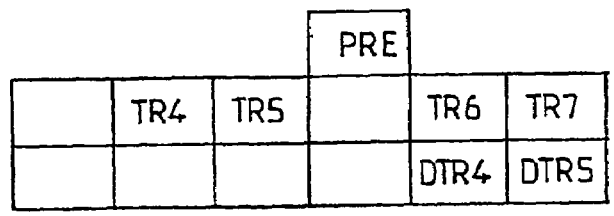
Figure 7:
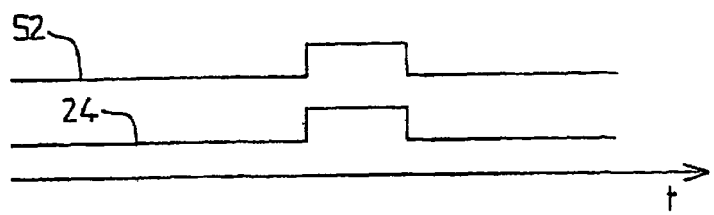
Figure 8:
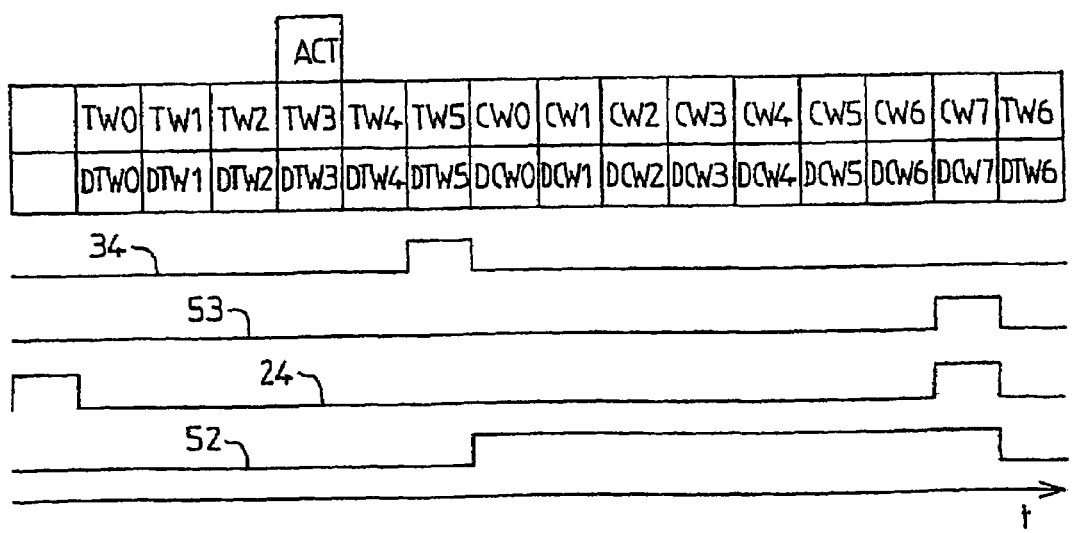
Figure 9:
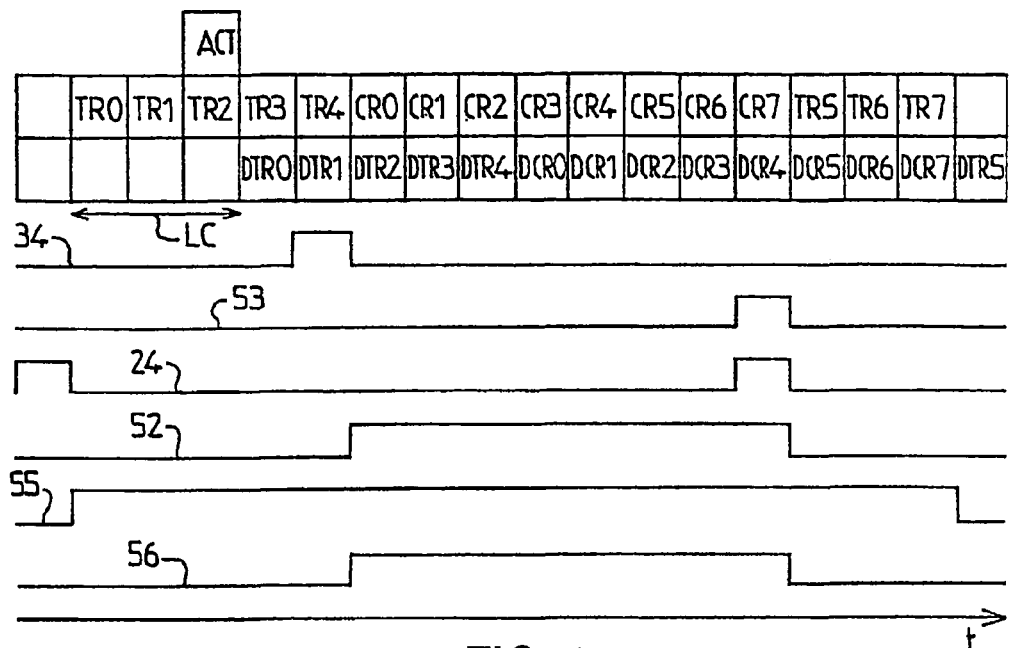
Figure 10:
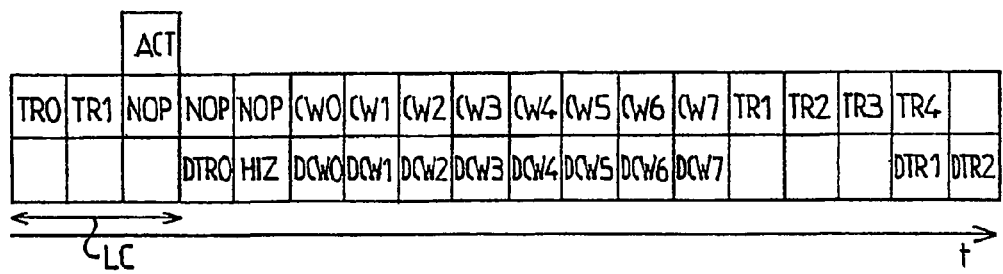
Figure 11:
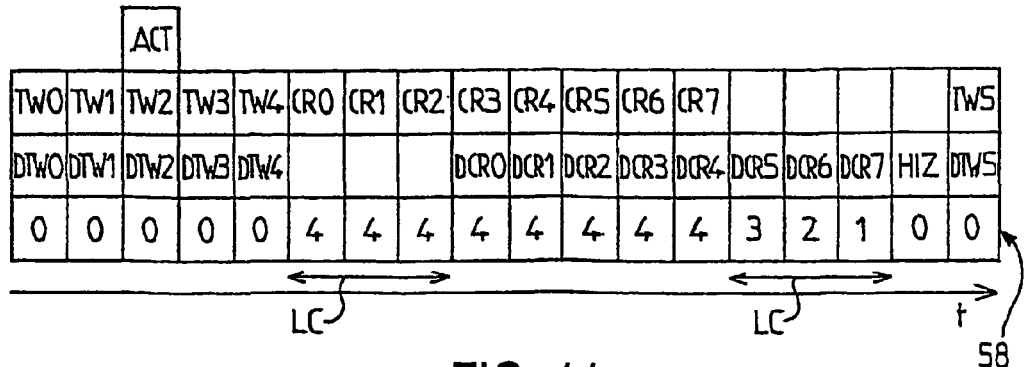

In the drawings:

FIG. 1 shows diagrammatically a data processing system according to the invention, FIG. 2 shows diagrammatically a programmable memory interface circuit according to the invention, FIG. 3 shows a sequence of bits coding a memory address of the system of FIG. 1, FIG. 4 is an address mapping of the memory of the system shown in FIG. 1, FIGS. 5a to 5c illustrate three steps of pre-processing a request for access by the memory interface circuit shown in FIG. 2, FIGS. 5d and 5e illustrate two steps of post-processing a read request by the memory interface circuit shown in FIG. 2, FIG. 6a shows the development with respect to time of two access operations processed without the pre-processing steps shown in FIGS. 5a to 5c, FIG. 6b shows the development with respect to time of two access operations processed with the pre-processing steps of FIGS. 5a to 5c, FIG. 7 shows the development of a preload of a bank designated by an access request of a central unit during the realization of an access operation of a data processing circuit within the system shown in FIG. 1, FIG. 8 shows the development of a write access operation by the central unit interrupting a write access operation by a data processing circuit, FIG. 9 shows the development of a read access operation by the central unit interrupting a read access operation by a data processing circuit, FIG. 10 shows the development of a write access operation by the central unit interrupting a read access operation by a data processing circuit, FIG. 11 shows the development of a read access operation by the central unit interrupting a write access operation by a data processing circuit.

The data processing system shown in FIG. 1 comprises a memory 1 of the SDRAM type comprising four banks A, B, C and D. The memory 1 is connected to a memory interface circuit 2 comprising a buffer memory 3. The interface circuit 2 is connected to a central unit 4 comprising a logic and arithmetic unit 5 and a controller 6, and to a data processing circuit 7. For example, the data processing circuit 7 is a processor dedicated to processing audio, video and graphic (AVG) data such as data in the MPEG format (Motion Picture Expert Group).

The central unit 4 is connected to the interface circuit 2 by connection means 8 comprising a data bus, an address bus and command lines. The data processing circuit 7 is connected to the interface circuit 2 by connection means 9 also comprising a data bus 15, an address bus and command lines 16, which can be seen in FIG. 2. A data interface module 40 is connected to the data bus 15 and ensures the reception and transmission of AVG data from the interface circuit 2.

The interface circuit 2 is connected to the memory 1 by connection means 17 comprising a data bus 10, an address bus 11, two bank selection lines 12 and 13 and command lines 14. A mask command DQM also allows selection of a part of each memory location which is accessed when the data to be read or written are shorter than the memory word. A memory word is made up of, for example, 32 bits.

The memory 1 is a collective memory in which the central unit 4 performs access operations for reading and writing data and instruction codes and in which the data processing circuit 7 performs access operations for reading and writing the AVG data Per design of the memory 1, a single access operation may be performed simultaneously. The central unit 4 and the data processing circuit 7 access the memory 1, both for writing and reading, by way of the interface circuit 2 by producing an access request sent to the interface circuit 2, i.e. a transfer command to be executed by the interface circuit 2.

In a variant, several analog data processing circuits each produce requests for access to the memory 1. In this case, the different data processing circuits communicate with the interface circuit 2 via a common data central unit which transmits in known manner the access requests and the corresponding data between the data processing circuit transmitting the request and the interface circuit 2. In this case, the block 7 of FIG. 1 is considered to represent a set of data processing circuits and their common data central unit.

Per design of the memory 1, an access operation is performed in one or several bursts of consecutive locations in one or several banks. In the embodiment under consideration, the requests of the data processing circuit 7 refer each time to 16 memory words representing, for example, pixel values of a portion of the image. The requests by the central unit may refer to 1, 4 or 8 memory words.

An access request designates a set of memory locations that must form the subject of an access and defines a series of data to be transferred and a transfer direction to be effected. For example, the transfer direction is defined by the high or low positioning of one or several specific input registers of the interface circuit 2. A series of data to be read is designated by an address in the memory 1. A series of data to be written is designated by a signal on a data bus at the input of the interface circuit 2. The memory locations that form the subject of an access are defined by the following parameters: an address of a first location of a first block to be read or written in the memory 1, a number of blocks to be read or written, a number of locations to be skipped between each block and a number of consecutive memory locations to be read or written in each block. Of course there may also be a single block of contiguous locations. An address comprises a bank number, a row number and a column number.

The interface circuit 2 treats each access request in such a way that the defined series of data is transferred from the source of the request to the memory locations thus defined, or from the locations thus defined to the source of the request, according to whether a write or a read request is concerned.

The operation of the memory interface circuit 2 will now be described with reference to FIG. 2. A processing phase which is specific for the access requests sent by the data processing circuit 7 will be described first.

The interface circuit 2 comprises an arbitration module 18 connected to the command lines 16 and dedicated to the arbitration of the access requests sent by the processing circuit or circuits 7. The arbitration module 18 applies a certain arbitration procedure so as to determine the order in which the access requests that are in the queue and emanate from the processing circuit or circuits 7 must be executed. At the start of this procedure, an access request 42 is accepted and transmitted to a pre-processing module 19 by means of a command register, whereafter the remaining requests in the queue are re-arbitrated.

For example, the accepted access request 42 is coded in this command register in the following manner: the eight least significant bits designate a number of memory words to be skipped between each block of data to be read or written, the four subsequent bits designate a number of consecutive memory words per block, the next bit designates the type of access among the types of reading and writing and the subsequent bits designate the address of a first memory word of a first block to be read or written in the memory 1.

The pre-processing module 19 applies a procedure in two steps to the access request 42 received from the circuit or from one of the circuits 7:

in a regrouping step, the number of different banks concerned for the access request is computed. When the access request concerns several banks, it is divided into as many parts of access requests. Each request part designates all the memory locations designated by the request and belonging to a different bank.

in a sequencing step, the pre-processing module 19 sequences the request parts produced from the pre-processed request so as to prevent that two parts of the executed request successively concern one and the same bank. To this end, it determines the bank concerned for the last part of the request immediately preceding the request during pre-processing and places a part of the request designating a different bank at the first location.

As soon as the part or parts of the request 21 supplied from the access request are available, each with a designated bank number, the number of the row designated in the bank, the number and the list of columns designated in the row and an indicator of the access type, they are transmitted to a column generator 20 in the order determined above. The column generator 20 is dedicated to the access requests of the data processing circuit 7.

The pre-processing module 19 sends a signal 23 to a collision manager 22, which signal indicates the presence of a part of the request ready to be executed.

A processing phase which is specific for the access requests sent by the central unit 4 will now be described. An access request from the central unit 4 is received by a central unit interface module 28 connected to the connection means 8. The interface module 28 comprises a queue which contains only a single request waiting to be processed. The interface module 28 waits until the request which is in the process of being processed is ended before it accepts the next request. A request for access to the memory 1 coming from the central unit 4 always concerns a series of consecutive addresses, i.e. it does not comprise a skipped location. When it accepts a request, the interface module 28 transmits a signal 29 to the collision manager 22 indicating the presence of a central unit request which is ready to be executed and it transmits the accepted request 33 to a column generator 30 dedicated to the access requests of the central unit 4.

The collision manager 22 has the function of arbitrating between the parts of the request and the central unit requests which are ready to be executed. The collision manager 22 manages the realization of access operations requested by the central unit 4 and the data processing circuit or circuits 7 so as to process the requests which have first priority. Indeed, the AVG data are considered as ordinary data, in contrast to the data and instruction codes of the central unit 4 which are considered as priority data. In order to operate, the collision manager 22 generates activation signals 24 and 34 destined for the column generators 20 and 30, respectively, in accordance with a predetermined method.

A processing phase which is common for all the requests will now be described. The column generators 20 and 30 are activated by the reception of the activation signal 24 or 34 of the collision manager 22. Upon reception of the corresponding activation signal, the column generator 20 or 30 processes the part or parts 21 of the request of the data processing circuit or the request of the central unit 33, respectively, by translating it into a series of column numbers 31, or into a series of column numbers 32, respectively, so as to form access demands at an appropriate detailed level for a command generator 25 (numbers of bank, row and column of each memory location concerned by the part of the request or by the request of the central unit, respectively). In co-operation with the activated column generator 20 or 30, the command generator 25 also generates a succession of elementary access commands, each elementary command defining an operation of access to a single address.

The command generator 25 also produces commands which are necessary for preparing access operations to be performed, such as preload commands for the bank concerned and activation of the row forming the subject of an access operation. The command generator 25 also ensures the production of commands which are necessary for regular refreshing of the memory 1, for example, of the order of 64 refreshes per millisecond.

A signal generator 26 generates command signals on the lines 14, which signals are specific for the memory 1, for example, RAS, CAS and WE signals which are known to those skilled in the art, as a function of the commands 27 sent by the command generator 25. Each data item of the series defined by the request is transferred by the data bus 10 between a memory location of the memory 1 and the buffer memory 3. For each data item, the bank is selected by positioning the bank selection lines 12 and 13, and the row and column numbers are selected by the address bus 11. The interface 2 also comprises a module for monitoring the state of the banks 54, which module generates signals indicating the state of each bank and its activity.

Other characteristic features of the data processing system shown in FIG. 1 will now be described with reference to FIGS. 3 and 4.

FIG. 3 shows a sequence 35 of 24 coding bits of an address of the memory 1 as designated in an access request received by the interface circuit 2. Each coding bit is individually marked by a weight ranging from 0 to 23, respectively. FIG. 3 also shows the interpretation of each bit of the sequence 35 by the interface circuit 2. In the example shown, the memory 1 is supposed to be a SDRAM memory having a total capacity of 64 Mo, with four banks of 256 columns by 2048 rows each. Consequently, a column number is coded at 8 bits, a row number at 11 bits and a bank number at 2 bits, a complete address being coded at 2+11+ 8=21 bits. It is of course also possible to use banks having a different row and/or column number by adapting the number of bits used for coding the corresponding number. It is also possible to use two identical SDRAM memory units for the memory 1, having four banks each and, in a corresponding way, to lengthen the addresses of a selection bit of the memory unit. In practice, the addresses are normalized at 32 bits, in which the excess most significant bits denoted by the reference numeral 36 are not used.

As is shown in FIG. 3, the interface circuit 2 converts an address in an access request coming from the processing circuit 7 or from the central unit 4 by means of the following method: the bank is determined by a binary code of two bits formed, in a decreasing order of weight, by bits having a weight of 20 and 3, respectively, of the sequence 35, hereinafter denoted by B1 and B0, respectively. The column number is determined by a binary code of eight bits formed, in a decreasing order of weight, from bits having weights of 8, 7, 6, 5, 4, 2, 1 and 0, respectively, of the sequence 35. The row number is determined by a binary code of eleven bits formed, in a decreasing order of weight, from bits having weights of 19 to 9, respectively, of the sequence 35.

The banks are selected in the following manner: the selection bit of the bank B1 designates either the couple of banks A–B (low value) or the couple of banks C–D (high value). Within the respective couples, the selection bit of the bank B0 designates either the bank A, or C (low value), respectively, or the bank B or D (high value), respectively.

In the system of FIG. 1, the data processing circuit 7 and the central unit 4 are designed in such a way that they read or write the data which belong to them in a different couple of A–B or C–D banks. For example, the AVG data belonging to the data processing circuit 7 are written, read and memorized in the couple of banks A–B, the bit B1 being always positioned at its low value in the addresses designated by the access requests of the data processing circuit 7. Reciprocally, the data belonging to the central unit 4, for example, command instructions, are written, read and memorized in the couple of banks C–D, the bit B1 being always positioned at its high value in the addresses designated by the corresponding access requests of the central unit 4.

Consequently, with reference to FIG. 4, the address mapping of the memory 1 is as follows. In an increasing order of addresses, represented by the axis 37, the memory 1 has a first zone 38 dedicated to the data belonging to the data processing circuit 7 and constituted by an alternation of blocks of banks A and B, each block having a length L of 8 words, and a second zone 39 dedicated to the data belonging to the central unit 4 and constituted by an alternation of blocks of the banks C and D of the same length L.

A request of the data processing circuit 7 designates a series in a sequence of sixteen addresses of the first zone 38 of the memory, for example, in the form of a number of blocks, a number of words per block and a number of locations to be skipped between each block. Because of the mapping of the memory 1, these sixteen addresses may be distributed in an arbitrary manner between the banks A and B. In the frequent case where a request designates sixteen consecutive addresses, they always correspond to locations which have been evenly distributed between the banks A and B. This particular feature reduces the probability of occurrence of a sequence of two requests or two consecutive parts of requests designating one and the same bank.

As the conversion of the addresses in memory locations is effected by the interface circuit 2, the addressing mode used by the central unit 4 and the processing circuit 7 do not need to be modified for realizing the mapping of memory 1. This addressing mode may thus remain compatible with other components with which the central unit 4 and the processing circuit 7 must communicate.

The pre-processing of the requests by the pre-processing module 19 will now be explained in greater detail with reference to FIGS. 5a to 5c.

FIG. 5a diagrammatically shows the access request 42 received from the arbitration module 18 by the pre-processing module 19. The first line indicates the number of columns that form the subject of an access operation in a certain row specified by the request. The second line indicates the bank to which each column belongs. It is supposed that the columns designated c1 to c16 of the memory 1 comprise data d1 to dl6.

With reference to FIG. 5b, the pre-processing module 19 reads the numbers of the sixteen columns designated by the request 42 in the order in which they are designated and, for each column, sends a number encoded on one bit of the bank in which the column is present (for example 0 for the bank A and 1 for the bank B) to the interface module 40 through a queue 41. The pre-processing module 19 also determines the number of different banks designated in the request.

With reference to FIG. 5c, the pre-processing module 19 comprises a state indicator 44 indicating the number of the bank in which the last column is situated which is designated by the last request or part of the request which it has pre-processed previously, which is now being processed by the command processor 25 or is queuing behind an access request of the central unit. The state indicator 44 indicates the bank A in FIG. 5c. When the request 42 designates several banks, i.e. A and B in the example shown, the pre-processing module 19 re-sequences the columns of the request 42 by regrouping them per associated bank into as many column series. The column series belonging to a bank different from that indicated by the state indicator 44, i.e. belonging to bank B in the example shown, is placed first. The series of column numbers c2 and c4 to c16 designated, in this order, in the request 42 and belonging to bank B is thus processed as a first part of the request 21a. The series of column numbers c1 and c3 designated, in this order, in the request 42 and belonging to bank A is processed as a second part of the request 21b. The request parts 21a and 21b are transmitted, in this order, to the column generator 20, as has been explained hereinbefore.

A phase of post-processing requests of the read type of the data processing circuit 7 by the interface module 40 will now be elucidated with reference to FIGS. 5d and 5e. It is supposed that the request 42 processed is of the read type.

With reference to FIG. 5d, the processing of the first part of the request by the command generator 25 involves reading of the data in the order in which the columns have been designated to the column generator 20. The first data item transferred to the interface circuit 2 is thus d2, which was memorized in the column c2. As from the arrival of a data item read, the interface module 40 reads an address available from the buffer memory 3 in a queue 43 comprising all the available addresses and temporarily stores the received data item d2 at this address @1. The interface module 40 also comprises two address queues 45a and 45b dedicated to the data from the banks A and B, respectively. The state indicator 44 now indicates the bank B in which the data are being read. The interface module 40 thus copies the storage address @1 in the queue 45b dedicated to the data from the bank B. This process is repeated for the whole series of data d1 to d16 defined by the request 42.

With reference to FIG. 5e it is supposed that all the data have been transferred from the memory 1 into the buffer memory 3 of the interface circuit 2. The address queues 45a and 45b are shown in their final state. The interface module 40 ensures the re-sequencing of the received data. To this end, the queue 41 is read. At each bank number read, the interface module 40 reads the first address of the queue dedicated to the data from the corresponding bank, i.e. first the address @15 in queue 45a, because the first bank number read is 0. It reads the data item stored at the address @15, which is the data item d1, and transmits it on the data bus 15 to the processing circuit 7. The address @15 is released and reset in the queue 43. This process is repeated for all the bank numbers of the queue 41 until a signal is read which indicates that the last column of the request has been reached. The request is then terminated. The data are thus transferred to the processing circuit 7 in the order of the memory locations defined by the request 42.

For a write request, the interface module 40 performs a pre-processing operation which is symmetrical to the post-processing operation described hereinbefore. During the execution of a part of the request or of a request from the current central unit (current access), the command generator 25 examines the parameters of a part of the request or of a subsequent request of the central unit under preparation (subsequent access). When the subsequent access refers to a bank which is different from the bank concerned by the current access, the command generator 25 generates the preload and activation commands of the bank concerned by the subsequent access during the execution of the current access in such a way that no clock cycle is lost for preparing the subsequent access. To this end, the command generator 25 generates the commands which correspond to the signals which it receives simultaneously from the column generators 20 and 30 and from the collision manager 22 in the following order of decreasing priority:

1—preload of a bank designated by a request of the central unit,
2—activation of a bank designated by a request of the central unit,
3—generation of an elementary access command for the central unit,
4—generation of an elementary access command for the processing circuit 7,
5—activation of a bank designated by a request of the processing circuit 7,
6—preload of an arbitrary bank,
7—neutral command.

FIGS. 6a and 6b illustrate a reduction of the access times obtained by virtue of pre-processing requests by the interface circuit 2. It is supposed that two requests 46 and 47 of the processing circuit 7 are processed consecutively without a request from the central unit 4 occurring. The request 46 designates, in this order, a batch 46a of eight columns of the bank A, a batch 46b of three columns of the bank B, a batch 46c of two columns of the bank A and a batch 46d of three columns of the bank B. The request 47 designates, in this order, a batch 47a of eight columns of the bank B and a batch 47b of eight columns of the bank A.

FIG. 6a illustrates the progress with respect to time of processing the requests 46 and 47 if the requests are executed without pre-processing. The realization of an access operation to a bank necessitates an operation of preparing the access by pre-loading of the bank and by activating the row forming the subject of an access operation. This preparation requires a time $\Delta t$ which has a value of, for example, 6 clock cycles of the SDRAM memory. The preparation of the subsequent access operation is performed from the start of the transfer of data corresponding to the current access. However, the transfers corresponding to the batches of the columns 46b and 46c are shorter than the preparation time $\Delta t$, such that a delay is lost before the transfers corresponding to the batches 46c and 46d. Moreover, the request 47 starts with an access operation in the bank B in which the last column accessed in the course of the access operation 46 is present. A delay $\Delta t$ is thus lost during the preparation of the bank B between the processing of two requests.

FIG. 6b illustrates the progress with respect to time of processing of the requests 46 and 47 with the pre-processing operation by the module 19. The transfer commands of data corresponding to the column batches 46a and 46c are regrouped into a first request part 48 and are consecutively processed in such a way that the delay lost before processing of the batch 46c is suppressed. The commands for data transfers corresponding to the column batches 46b and 46d are regrouped into a second request part 49 and are consecutively processed in such a way that the delay lost before processing the batch 46d is suppressed. The request 47 is processed in two request parts 50 and 51 designating the column batch 47a and the column batch 47b, respectively, by starting with the part 51 designating the column batch 47b, such that the operation of the corresponding transfer of data between the bank A and the interface circuit 2 is prepared during the realization of the transfer corresponding to the request part 49. The delay lost between processing of the two requests 46 and 47 is thus also suppressed. The time required for processing the two requests is thus substantially reduced, for example, by the order of 30% with respect to the case where the pre-processing operation is not performed.

The arbitration of the access operations by the collision manager 22 will now be described in greater detail with reference to FIGS. 7 to 11. All of these Figures show the development as a function of time t of one or several access operations of different types. Each column of the tables shown corresponds to a clock cycle of, for example, 8 ns of the SDRAM memory. The first line of the tables represents the transmission of certain preparation commands of the SDRAM on the command lines 14. A preload command is symbolized by PRE. An activation command is symbolized by ACT. The second line of the tables represents the transmission of elementary read or write commands on the command lines 14. An elementary read or write command requested by the data processing circuit is symbolized by TR and TW, respectively. An elementary read command or write command required by the central unit is symbolized by CR and CW, respectively. An access request designating several memory locations is translated into several successive elementary commands enumerated as from 0. The third line of the tables represents the data in the course of their transfer on the data bus 10. A data item transferred while executing an elementary read or write command is symbolized by the letter D followed by the symbol of the corresponding elementary command.

With reference to FIG. 7, when the collision manager 22 receives the signal 29 during realization of an access operation of the data processing circuit 7 and the bank designated by the request of the central unit 33 must be pre-loaded, it gives the command generator 25 a command to insert a preload command between two elementary commands for the access operation which is in progress, as is shown by means of the arrow 59. The collision manager 22 suspends the generation of the elementary access commands so as to release the command lines of the memory in order that a preload command can be transmitted. To this end, the column generator 20 activates a standby signal 52 throughout the duration by which the generation of the elementary commands must be suspended, i.e. for example, during a clock cycle. The collision manager 22 commands the restart of generating the elementary access commands by transmitting the activation signal 24 to the column generator 20 one clock cycle before said restart, which reinitializes the standby signal 52.

With reference to FIG. 8, it is supposed that a write access of the data processing circuit 7 is activated by the activation signal 24 and is being realized when the central unit 4 requests a write access. An activation command of the bank designated by the request of the central unit is produced during the realization of the access operation in progress, i.e. during the transmission of the elementary command TW3 in the example shown. It is noted that an activation command produces the copy of a row of the SDRAM in a register in which the individual columns can be subsequently read or written and that its execution takes several, for example, two clock cycles. As soon as the activation is terminated, i.e. at the third clock cycle subsequent to the activation command in the example shown, the access operation which is in progress is suspended by the standby signal 52. In the example shown, the access operation which is in progress is suspended after the transmission of the elementary command TW5. The write access of the central unit is launched by the activation signal 34. During production of the last elementary access command for the access operation requested by the central unit, i.e. the elementary command CW7, the column generator 30 sends an end-of-access signal 53 to the manager 22, which leads to the transmission of an activation signal 24 and the re-initialization of the standby signal 52. The generation of the elementary access commands for the suspended access operation is resumed as from the subsequent clock cycle, with the subsequent elementary command TW6. By this sequence of elementary commands, a transfer of data is effected at each clock cycle without any loss of passband.

With reference to FIG. 9, a read access operation of the data processing circuit 7 is launched by the transmission of the activation signal 24, and then the collision manager receives the signal 29. As in the previous case, an activation command of the bank designated by the request of the central unit 4 is transmitted during the realization of the access operation of the circuit 7, i.e. during the transmission of the elementary command TR2. The signals 24, 34 and 52 are then managed as described previously for inserting the access operation of the central unit by temporarily suspending the access operation of the circuit 7. During a write access operation, the data to be written are sent on to the data bus 10 in the same clock cycle as the transmission of the corresponding elementary commands. In contrast, during a read access operation, there is a delay between the transmission of an elementary command and the transfer of the corresponding data item because of a delay of access to the individual columns LC which are intrinsic in the memory 1, and referred to as latency CAS. This delay is, for example, 3 clock cycles.

The module 54 for monitoring the state of the banks comprises, for each bank, an access indicator which is activated at the start of each access operation in this bank and reinitialized at the end of the access operation. In the example shown, the access indicator 55 is that for the bank, for example, A in which the data are read by the data processing circuit 7 and the access indicator 56 is that for the bank, for example, C designated by the request of the central unit 4.

With reference to FIG. 10, an elementary command sequence is shown which is produced in the case where a write access request of the central unit 4 is produced during a read access operation of the circuit 7. To allow transition of a read access to a write access, the data bus 10 of the memory must pass from an output state to an input state. This change of states is performed by transistors of the bus 10 which, to avoid any risk of short-circuit, pass through a state of strong impedance represented by the symbol HIZ in which no transfer of data can be effected on the bus 10. This transmission requires a delay of one clock cycle. The access of the central unit starts as soon as the activation is terminated at the third clock cycle subsequent to the command ACT, while the transition through the state HIZ is effected just before, i.e. at the second clock cycle subsequent to the command ACT. The last data item read which can thus be transferred on the bus 10 is that transferred at the first clock cycle subsequent to the command ACT. As the latency CAS is three clock cycles, this data item corresponds to the elementary command transmitted in the second clock cycle preceding the command ACT, i.e. the command TR0 in the example shown. Consequently, it is useless to produce read commands from the first cycle preceding the transmission of the command ACT. In fact, the elementary access commands for the access operation to be suspended are replaced by neutral commands NOP based on the command ACT until the start of the access operation of the central unit. However, the elementary access command immediately preceding the command ACT, i.e. TR1, is produced without having the time to be executed before the suspension of the access operation. Consequently, in this case, the suspended access operation is resumed as soon as the completion of the access operation of the central unit by the retransmission of the command TR1 that has not been executed. To this end, the collision manager 22 updates counters of the column generator 20 during its reactivation. The number of elementary commands to be retransmitted must evidently be adapted as a function of the characteristic features of the memory used in each particular realization.

FIG. 11 shows a sequence of elementary commands produced when a read access operation of the central unit 4 suspends a write access operation of the circuit 7. In this case, the transition to the state HIZ must be effected at the end of the access operation of the central unit. However, to allow the transfer of all the data read by the central unit, a delay which is equal to the latency CAS, i.e. three clock cycles in the example shown, must be left between the production of the last read command CR7 and the transition to the state HiZ. During this delay, the column generator 20 is in a standby position. The suspended access operation is resumed immediately after the transition.

To respect this delay, the module 54 for monitoring the state of the banks is provided with a counter 58 whose value at each clock cycle is indicated in the third line of S the table in FIG. 11. The counter 58 is positioned at a value which is equal to LC+1, i.e. the value 4 in the example shown, whenever an elementary read command is transmitted. The counter 58 is decremented by one unit every time when no elementary read command is transmitted. As soon as it reaches the value of zero, a signal 57 is produced by the module 54, as is shown in FIG. 2, so as to indicate to the command generator 25 that the transition to the state HIZ may be effected, and this immediately.

Although the invention has been described with reference to a particular embodiment, it will be evident that it is by no means limited and that it comprises all the equivalent techniques of the means described as well as their combinations if they are within the scope of the invention. There are actually numerous ways of performing the functions by means of hardware elements and/or computer program elements. In this respect, the Figures are very diagrammatic, each Figure representing a single embodiment. Although a Figure may show various functions in the form of separate blocks, it does not exclude that a function may be performed by several separate blocks.

The invention claimed is:

1. A method of managing access of a plurality of data processing circuits to a common memory comprising several banks, in which a single access to the memory can be realized simultaneously, the memory being connected via an appropriate interface to at least a circuit for processing ordinary data and to a circuit for processing priority data, the method comprising the steps of:

producing, at the level of the interface, an access request from the circuit for processing ordinary data to a bank of the memory, starting a response to the demanded access, subsequently producing, at the level of the interface, an access request from the circuit for processing priority data to another bank of the memory, during the response to the access requested by the ordinary data processing circuit, performing precharge of said other bank of the memory, suspending the access being responded to as soon as said precharge is completed for immediately responding to the access to the circuit for processing priority data.

2. A method as claimed in claim 1, also comprising a step of resuming the suspended access as soon as the access to the priority data processing circuit has been completed.

3. A method as claimed in claim 1, wherein the priority data processing circuit comprises a controller, the priority data comprising command instructions.

4. A method as claimed in claim 1, wherein the memory is of the SDRAM type, precharge comprising a step of activating a row of said other bank forming the subject of an access operation.

5. A data processing system comprising:

a memory comprising several banks, an interface circuit connected to the memory, at least a circuit for processing ordinary data and a circuit for processing priority data both connected to the interface circuit, each data processing circuit being suitable for requesting access to the memory via the interface circuit, which produces commands corresponding to the requested access opertions, in which a single access to said memory can be realized simultaneously, in which system the interface circuit comprises means for:

precharging a certain bank when the priority data processing circuit demands access to said certain bank of the memory during a response to an access operation of the ordinary data processing circuit to another bank of the memory, suspending the access being responded to as soon as said precharing for responding to the access of the priority data processing circuit to said certain bank has been completed.

6. A system as claimed in claim 5, wherein the interface circuit also comprises means for resuming the suspended access as soon as the access to the priority data processing circuit has been completed.

7. A system as claimed in claim 5, in which each data processing circuit can request access to said memory by sending an access request to the interface circuit, each access request defining a type of access among the read and write types and designating one or several memory locations forming the subject of an access operation, the access requests of the ordinary data processing circuit designating memory locations in at least one bank of said memory dedicated to the ordinary data, the access requests of the priority data processing circuit designating memory locations in at least one bank of said memory dedicated to the priority data.

8. An interface circuit of a memory comprising several banks and being capable of simultaneously supporting only a single access operation, intended to be connected to at least a circuit for processing ordinary data and to a circuit for processing priority data, each data processing circuit being suitable for requesting access to the memory via the interface circuit which is suitable for producing commands corresponding to the requested access operations, and comprises means for:

precharing a certain bank when the priority data processing circuit requests access to said certain bank of the memory during response to an access operation of the ordinary data processing circuit to another bank of the memory, suspending the access being responded to as soon as said precharing for responding to the access of the priority data processing circuit to said certain bank has been completed.

9. An interface circuit as claimed in claim 8, also comprising means for resuming the suspended access as soon as the access to the circuit for processing priority data has been completed.

10. A computer program comprising instruction codes suitable to be read or stored on a record carrier, said instruction codes being suitable to be executed by a programmable interface circuit intended to be connected to a memory comprising several banks and being capable of simultaneously supporting only a single access operation, and to at least a circuit for processing ordinary data and to a circuit for processing priority data, each data processing circuit being suitable for requesting access to the memory via the interface circuit which is suitable for producing commands corresponding to the demanded access operations, in which program the execution of said instruction codes is suitable for performing, at the level of the interface circuit, the steps of:

precharging a certain bank when the priority data processing circuit requests access to said certain bank of the memory during an access operation of the ordinary data processing circuit to another bank of the memory, suspending the access being responded to as soon as said precharing for responding to the access of the priority data processing circuit to said certain bank has been completed.

* * * * *